(12) United States Patent  
Somayajula et al.

(10) Patent No.: US 12,529,732 B2
(45) Date of Patent: Jan. 20, 2026

(54) ESTIMATING REMAINING LIFE OF A CAPACITOR IN A POWER CONVERTER

(71) Applicant: Eaton Intelligent Power Limited, Dublin (IE)

(72) Inventors: Deepak Balaji Somayajula, Pune (IN); Ranjith Kumar Sreenilayam Raveendran, Pune (IN); Kaijam Maurice Woodley, Brown Deer, WI (US); Thomas Michael Ruchti, Pewaukee, WI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 18/117,526

(22) Filed: Mar. 6, 2023

(65) Prior Publication Data

US 2024/0302447 A1     Sep. 12, 2024

(51) Int. Cl.
*G01R 31/392* (2019.01)
*G01R 31/367* (2019.01)
*G01R 31/3835* (2019.01)

(52) U.S. Cl.
CPC ......... *G01R 31/392* (2019.01); *G01R 31/367* (2019.01); *G01R 31/3835* (2019.01)

(58) Field of Classification Search
CPC ...... G01R 31/00; G01R 31/36; G01R 31/367; G01R 31/382; G01R 31/3835; G01R 31/392; G01R 31/50; G01R 31/64; H02M 1/00; H02M 1/0003; H02M 7/00; H02M 7/66
USPC ........................................ 324/500, 537, 548
See application file for complete search history.

(56) References Cited

U.S. PATENT DOCUMENTS

| | | | |
|---|---|---|---|
| 10,877,097 B2 | 12/2020 | Richter et al. | |
| 11,070,156 B2 * | 7/2021 | Oguma | H02P 23/14 |
| 12,176,836 B2 * | 12/2024 | Ritchey | H02J 3/381 |
| 2011/0196545 A1 * | 8/2011 | Miwa | H02J 7/0047 |
| | | | 700/292 |
| 2013/0264986 A1 * | 10/2013 | Niwa | H02P 29/025 |
| | | | 318/479 |
| 2015/0333544 A1 * | 11/2015 | Toya | H01M 10/48 |
| | | | 320/112 |
| 2016/0336792 A1 * | 11/2016 | Terazono | H02J 3/32 |
| 2018/0219388 A1 | 8/2018 | Aarskog | |
| 2019/0103756 A1 * | 4/2019 | Hasegawa | H02M 7/525 |

FOREIGN PATENT DOCUMENTS

CN         107776419 A  *  3/2018   ......... B60L 58/21

* cited by examiner

*Primary Examiner* — Hoai-An D. Nguyen
(74) *Attorney, Agent, or Firm* — DiBerardino McGovern IP Group LLC

(57) ABSTRACT

A drive system includes a first electrical network configured to convert time-varying power to direct current (DC) power; a second electrical network configured to convert DC power to time-varying power; an energy storage apparatus electrically connected to the first electrical network and the second electrical network; an estimation circuit including: an isolation switch configured to isolate the energy storage apparatus from the second electrical network, a discharge control switch, and an electrical sensor configured to measure electrical data related to the energy storage apparatus; and a control system configured to estimate a remaining life of the energy storage apparatus based on data measured by the sensor while the capacitive network is isolated.

22 Claims, 7 Drawing Sheets

ESTIMATING REMAINING LIFE OF A CAPACITOR IN A POWER CONVERTER

TECHNICAL FIELD

This disclosure relates to estimating remaining life of a capacitor in a power converter.

BACKGROUND

A drive system, such as a variable speed drive, an adjustable speed drive, or an uninterruptable power supply, may be connected to an alternating current (AC) high-power electrical distribution system, such as a power grid. The drive system drives, powers, and/or controls a machine, or a non-machine type of load.

SUMMARY

In one general aspect, a drive system includes: a first electrical network configured to convert time-varying power to direct current (DC) power; a second electrical network configured to convert DC power to time-varying power; an energy storage apparatus electrically connected to the first electrical network and the second electrical network; an estimation circuit including: an isolation switch configured to isolate the energy storage apparatus from the second electrical network, a discharge control switch, and an electrical sensor configured to measure electrical data related to the energy storage apparatus; and a control system configured to estimate a remaining life of the energy storage apparatus based on data measured by the sensor while the capacitive network is isolated.

Implementations may include one or more of the following features.

The electrical sensor may be in parallel with the energy storage apparatus. The electrical sensor may be a voltage sensor. The data measured by the sensor may include a voltage profile that represents voltage of the energy storage apparatus at a plurality of times, and the control system estimates the remaining life of the energy storage apparatus based on the voltage profile. The control system also may be configured to: control the isolation switch to isolate the energy storage apparatus; control a charging switch to electrically connect the first electrical network and the energy storage apparatus; open the discharge control switch to charge the energy storage apparatus for a first time period; control the charging switch to disconnect the first electrical network from the energy storage apparatus; and close the discharge control switch to discharge the energy storage apparatus for a second time period. The voltage profile may include voltages measured by the voltage sensor during the first time period and voltages measured by the voltage sensor during the second time period.

In another aspect, an apparatus for a drive system includes: a control system configured to: control an isolation switch in an estimation circuit to isolate an energy storage apparatus of the drive system from an electrical network of the drive system, the electrical network configured to convert DC power to time-varying electrical power; control a charging switch and a discharge switch to charge the energy storage apparatus for a first time period; control the charging switch and the discharge switch to discharge the energy storage apparatus during a second time period after the first time period; determine an energy profile of the energy storage apparatus based on measurements taken during the first time period and the second time period; and estimate a remaining life of the energy storage apparatus based on the energy profile.

Implementations may include one or more of the following features.

The energy profile may include a measured voltage across the energy storage apparatus during the first time period and the second time period.

The control system also may be configured to receive a trigger, and, in these implementations, the control system may be configured to control the isolation switch, control the charging switch and the discharge switch, determine the energy profile, and estimate the remaining life only in response to receiving the trigger. The control system may include an input/output (I/O) interface. The trigger may be an input provided through the (I/O) interface. The trigger may be an internal trigger. The internal trigger may be generated on a pre-determined schedule such that the remaining life of the energy storage apparatus. The control system may be configured to provide an indication of the estimate of the remaining life through the I/O interface. The control system may be configured to provide an alarm when the estimate of the remaining life is less than a pre-determined amount of time.

The control system may be configured to estimate a capacitance of the energy storage apparatus based on the energy profile, and to estimate the remaining life based on the estimated capacitance. The control system may be configured to estimate the capacitance using a diagnostic Kalman filter, and to estimate the remaining life using a prognosis Kalman filter.

The apparatus also may include the estimation circuit.

The control system also may be configured to provide a recommendation for operating the drive system in a low stress mode if the remaining life is less than a threshold value.

In another aspect, a method includes: isolating an energy storage apparatus of a drive system from an inverter of the drive system; monitoring the energy storage apparatus with a sensor while charging the energy storage apparatus during a first period of time and discharging the energy storage apparatus during a second period of time; determining an energy profile of the energy storage apparatus based on data from the sensor, the data including measurements of one or more electrical properties related to the energy storage apparatus made by the sensor during the first time period and the second time period; and estimating a remaining life of the energy storage apparatus based on the energy profile.

Implementations may include one or more of the following features.

A capacitance of the energy storage apparatus may be estimated based on the energy profile, and the remaining life may be estimated based on the estimated capacitance. The capacitance may be estimated using a diagnostic Kalman filter, and the remaining life may be estimated using a prognosis Kalman filter.

Implementations of any of the techniques described herein may include an apparatus, a device, a system, and/or a method. The details of one or more implementations are set forth in the accompanying drawings and the description below. Other features will be apparent from the description and drawings, and from the claims.

DRAWING DESCRIPTION

DETAILED DESCRIPTION

Figure 1:
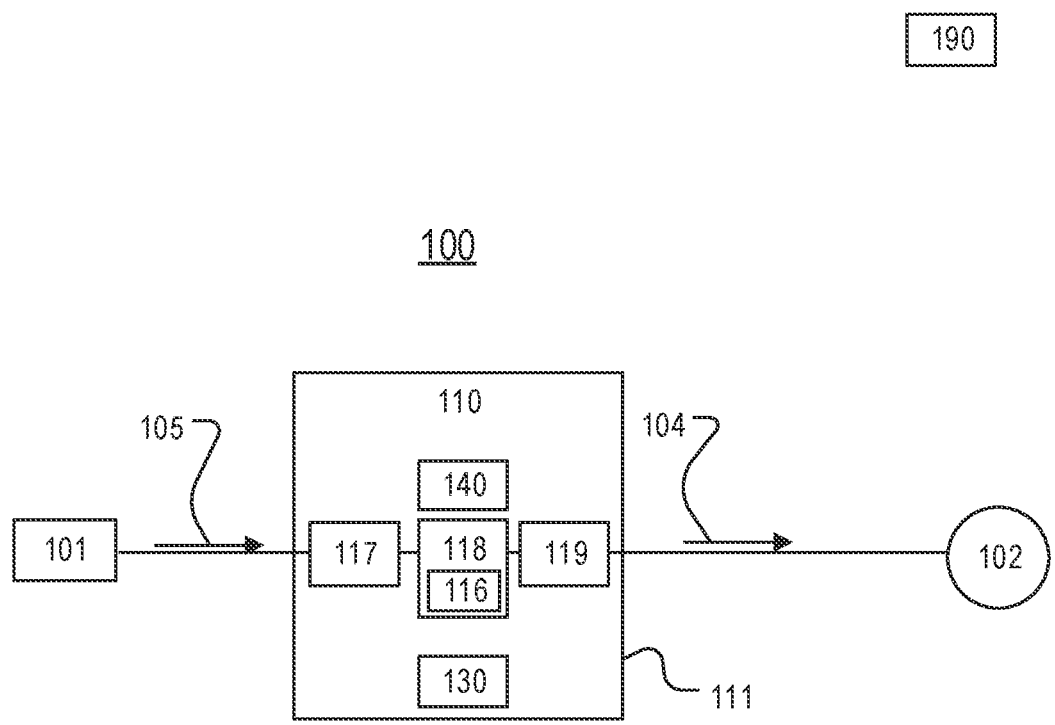
FIG. 1 is a block diagram of an example of system that includes a power converter.

FIG. 1 is a block diagram of a system 100. The system 100 includes a power converter 110 that is electrically connected to an alternating current (AC) electrical power distribution network 101 and a load 102. The power converter 110 generates a time-varying drive signal 104 for the load 102 based on AC electrical power 105 from the distribution network 101. For example, the power converter 110 may be a variable speed drive (VSD), a variable frequency drive (VFD), or an adjustable speed drive (ASD).

The electrical power distribution network 101 may be, for example, a multi-phase electrical power grid that provides electricity to industrial, commercial and/or residential customers. The AC electrical power distribution network 101 distributes AC electrical power that has a fundamental frequency of, for example, 50 or 60 Hertz (Hz). The distribution network 101 may have an operating voltage of, for example, up to 690V. The network 101 may include, for example, one or more transmission lines, distribution lines, power distribution or substation transformers, electrical cables, and/or any other mechanism for transmitting electricity.

The load 102 may be a machine-type load such as, for example, an induction machine, an induction motor, or a synchronous permanent magnet machine that operates at a speed and torque that is determined by the driver signal 104. The load 102 may be a non-machine load, such as a lighting system.

The power converter 110 includes a first electrical network 117, a second electrical network 119, and an energy storage apparatus 118 that is electrically connected to the first and second electrical networks 117, 119. The energy storage apparatus 118 includes a capacitor 116. The first electrical network 117 converts the AC power 105 from the distribution network 101 into DC power that is stored in the capacitor 116, and the second electrical network 119 modulates the DC power in the capacitor 116 to produce the drive signal 104. The first electrical network 117 may be a rectifier or an active front end (AFE). The second electrical network 119 may be an inverter.

In some implementations, the power converter 110 is bi-directional such that power may flow from the grid 101 to the load 102 and from the load 102 to the grid 101. In these implementations, the second electrical network 219 converts AC power from the load 102 into DC power that is stored in the capacitor 116, and the first electrical network 217 converts the DC power in the capacitor 116 into AC power that is provided to the grid 101.

The power converter 110 also includes a control system 130 and an estimation circuit 140. The estimation circuit 140 is configured to isolate the energy storage apparatus 118 (and the capacitor 116). The control system 130 estimates the remaining life of the capacitor 116 based on the electrical data from the sensor 142.

Failure of the capacitor 116 is the most common or one of the most common failure modes of the power converter 110. The lifetime of the capacitor 116 may be shortened due to stress that occurs during operation of the power converter 110. For example, unbalanced conditions in the grid 101 and/or the load 102 may cause ripple currents in the DC current that flows into the capacitor 116. The ripple currents heat the capacitor 116 and shorten the lifetime of the capacitor 116.

The control system 130 monitors the health of the capacitor 116, estimates the capacitance of the capacitor 116, and estimates the remaining life of the capacitor 116 based on the estimate of the capacitance. The control system 130 also may provide a strategy for operating the power converter 110 in a manner that extends the lifetime of the capacitor 116 to allow operation of the power converter 110 until a repair or replacement may be made. For example, the control system 130 may determine a low-stress operating mode for the power converter 110 that results in less or no ripple current or a reduced switching frequency. For example, the current and/or output power to the load 102 may be reduced in the low-stress operating mode. The control system 130 may present the operating strategy at the power converter 110 and/or at a separate device 190 that is in communication with the control system 130. The separate device 190 may be, for example, a phone, a computer, a laptop, or a workstation. In some implementations, the control system 130 places the power converter 110 in the low-stress operating mode when the estimated remaining life is less than a pre-determined amount of time.

Thus, the control system 130 promotes efficient operation of the power converter 110, reduces unexpected and unplanned downtime for the power converter 110 and the load 102, allows for more predictable maintenance and replacement schedules, and provides the operator of the power converter 110 with an indication of the wear on the power converter 110. Furthermore, the control system 130 estimates the remaining life of the capacitor 116 based on a direct estimate of the capacitance of the capacitor 116 instead of secondary effects such as, for example, measurements of ripple current and/or sound.

Figure 2A:
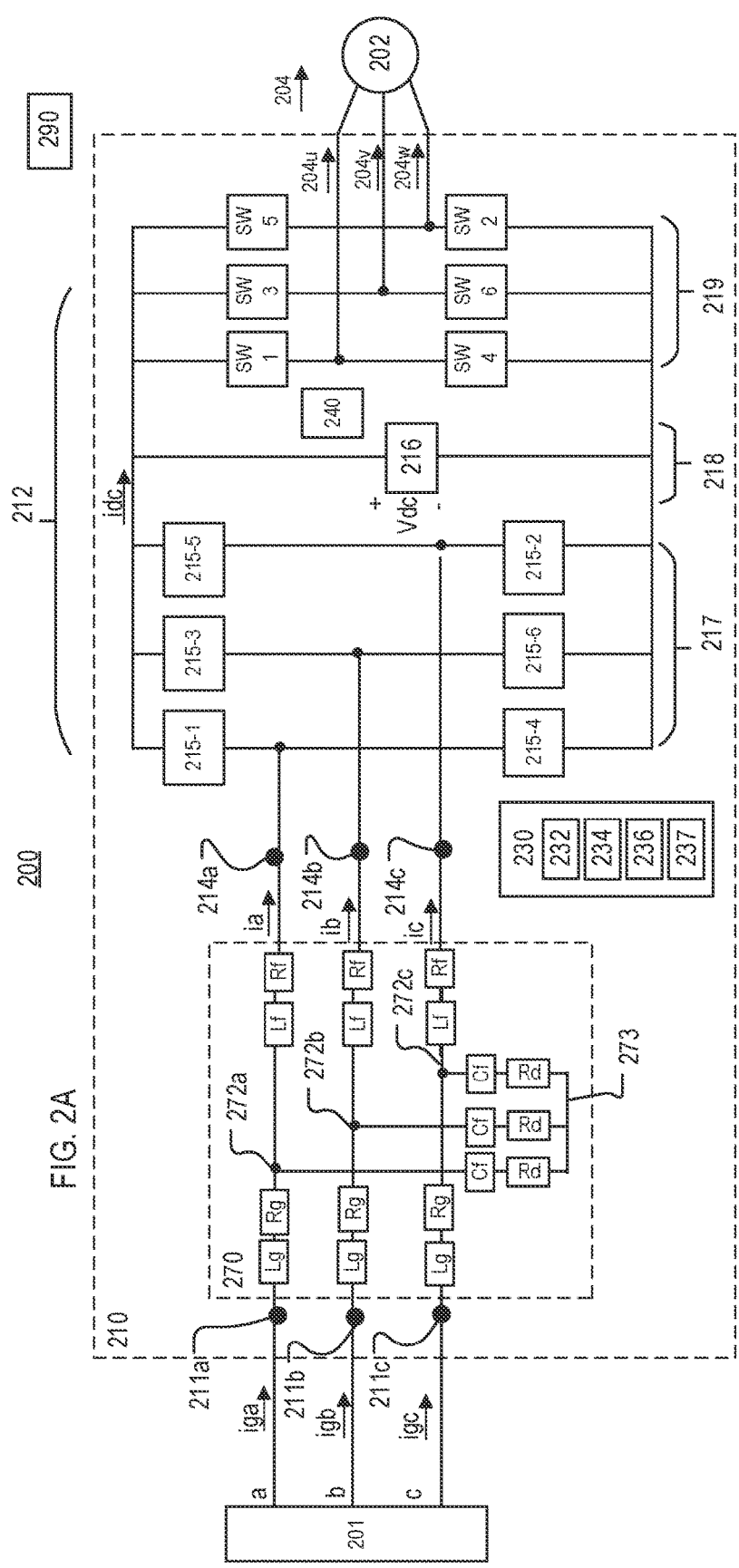
FIG. 2A is a schematic of another example of a system that includes a power converter.
Figure 2B:
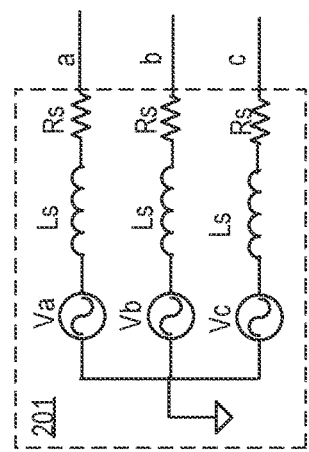
FIG. 2B is a schematic of an example of a three-phase AC electrical power distribution network.
Figure 3:
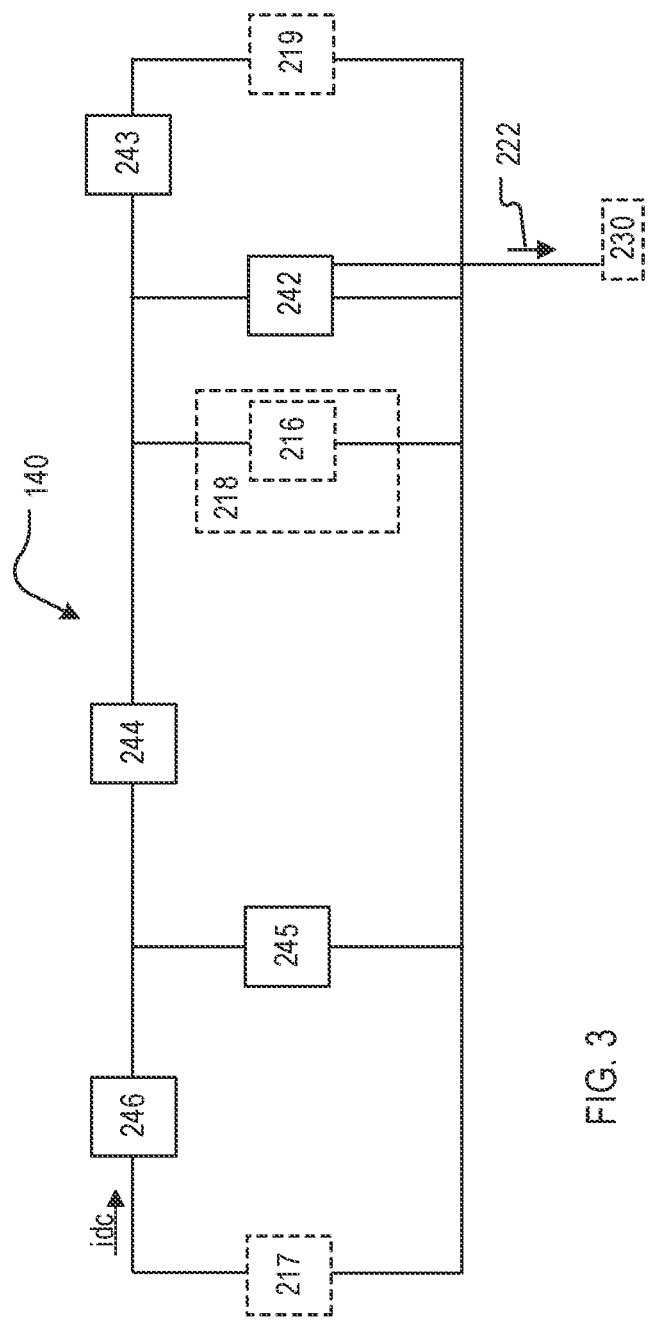
FIG. 3 is an example of an estimation circuit.

FIG. 2A is a schematic of a system 200. The dashed lines in FIG. 2A are used to show groupings of elements, and the dashed lines do not necessarily represent physical objects. FIG. 2B is a schematic of a three-phase AC electrical power distribution network 201. The system 200 includes a power converter 210 that includes an estimation circuit 240 and a control system 230. FIG. 3 shows the estimation circuit 240 in the power converter 210.

The power converter 210 is connected to a load 202 and a three-phase AC electrical power distribution network 201. The load 202 may be, for example, an induction motor or a permanent magnet synchronous machine. The power converter 210 may be in a housing or enclosure, such as a rack-mountable box or a cabinet. The system 200 also includes a control system 230 that implements a life estimation module 260 (FIG. 2C) to estimate the remaining life of a capacitor 216.

An overview of the power converter 210 is discussed before discussing the details of the estimation circuit 240 and the control system 230.

The electrical power distribution network 201 distributes AC electrical power that has a fundamental frequency of, for example, 50 or 60 Hertz (Hz). The distribution network 201 may include, for example, one or more transmission lines, distribution lines, electrical cables, and/or any other mechanism for transmitting electricity. The distribution network 201 includes three phases, which are referred to as a, b, and c. Each phase a, b, c has a respective grid voltage Va, Vb, Vc (FIG. 2B). The impedance of the distribution network 201 is represented by an inductor Ls in series with a resistance Rs. The impedance of the distribution network 201 depends on the impedance characteristics of the components included in the distribution network 201.

The power converter 210 includes input nodes 211a, 211b, 211c, each of which is electrically coupled to one of the three phases (a, b, c) of the distribution network 201. The power converter 210 also includes an LCL filter 270. The LCL filter system 270 includes inductors and capacitors, and may or may not include additional electronic components. For example, the LCL filter system 270 also includes damping resistors Rf. The LCL filter system 270 includes three LCL filters, one for each phase a, b, c. In phase a, the LCL filter 270 is connected between the input node 211a and an intermediate node 214a. The intermediate node 214a may be considered an input node of the electrical network 212. The LCL filter in phase a includes a grid-side inductor Lg, a converter-side inductor Lf, a filter capacitor Cf, and a damping resistor Rf in series with the filter capacitor Cf. The resistance of the converter-side inductor Lf is represented by an impedance Rf in series with the converter-side inductor Lf. The resistance of the grid-side inductor Lg is represented by an impedance Rg in series with the grid-side inductor Lg.

The grid-side inductor Lg is electrically connected to the input node 211a, and the converter-side inductor Lf is connected to the node 214a. The series combination of the filter capacitor Cf and the damping resistor Rd is connected to a node 272a, which is between the converter-side inductor Lf and the grid-side inductor Lg, and to a node 273. The input node 211b is connected to phase b of the LCL filter 270, and the input node 211c is connected to phase c of LCL filter 270. Each of phases b and c of the LCL filter is configured in the same manner as phase a. The series combination of the filter capacitor Cf and the damping resistor Rd of phase b is connected to a node 272b and the node 273, and the series combination of the filter capacitor Cf and the damping resistor Rd of phase c is connected to a node 272c and the node 273, as shown in FIG. 2A.

The power converter 210 includes a rectifier 217, an energy storage apparatus 218, and an inverter 219. The rectifier 217 is a three-phase, active front end (AFE) that includes six electronic switches 215-1 to 215-6 that rectify the AC currents ia, ib, ic into a DC current idc. Each electronic switches 215-1 to 215-6 is any type of controllable electronic switch and has an ON state that conducts current and an OFF state that does not conduct current. For example, each switch 215-1 to 215-6 may be a transistor, such as an insulated gate bipolar transistor (IGBT) or a metal-oxide semiconductor field effect transistor (MOSFET). The state of each electronic switch 215-1 to 215-6 is controlled by the control system 230. For example, in implementations in which the switches 215-1 to 215-6 are transistors, the control system 230 may control the state of a particular transistor 215-1 to 215-6 by controlling the voltage at the gate of that transistor. The control system 230 may be configured to control the electronic switches 215-1 to 215-6 based on a pulse width modulation (PWM) control scheme.

The electronic switches 215-1 to 215-6 are also electrically connected to the energy storage apparatus 218, which includes one or more capacitors 216. The rectified current idc flows into the energy storage apparatus 218 and is stored in the capacitor 216. The capacitor 216 is any type of capacitive device and may include more than one capacitive device and/or more than one type of capacitive device. In some implementations, the capacitor 216 is an electrolytic capacitor.

The inverter 219 includes a network of electronic switches SW1 to SW6 that are arranged to generate a three-phase, time-varying (or AC) drive signal 204. Each of the switches SW1 to SW6 may be, for example, a power transistor. The control system 230 controls the state of the switches SW1 to SW6 such that the inverter 219 modulates the DC power stored in the energy storage apparatus 218 into the three-phase drive signal 204. The three-phase driver signal 204 has phase components 204u, 204v, 204w, each of which is provided to one of the three phases of the load 202. The control system 230 may be configured to control the electronic switches 215-1 to 215-6 based on a PWM control scheme, with the frequency, amplitude, and phase of the drive signal 204 determining the operation of the load 202. For example, in implementations in which the load 202 is a motor, the frequency, amplitude, and phase of the drive signal 204 determine the torque, speed, and/or direction of the motor.

The discussion above relates to generating the AC drive signal 204 and providing the AC drive signal 204 to the load 202. However, the power converter 210 may be bi-directional. In implementations in which the power converter 210 is bi-directional, the control system 230 also controls the electronic switches 215-1 to 215-6 and SW1 to SW6 such that power can flow from the load 202 to the grid 201. Thus, energy generated by the load 202 may be returned to the grid 201 through the bi-directional power converter 210. Furthermore, the power converter 210 is provided as an example, and other configurations are possible. For example, the bi-directional power converter 210 may be implemented without the inverter 219 and configured to drive a DC load.

Figure 2C:
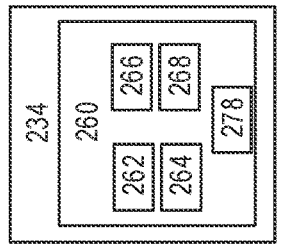
FIG. 2C is a block diagram of an example of an electronic storage for a control system.

Referring also to FIG. 2C, the control system 230 also implements the life estimation module 260. The life estimation module 260 includes a test mode block 262, a capacitance estimation block 264, a degradation estimate block 266, and a forecasting block 268. The test mode block 262 initiates a test mode in the power converter 210. The capacitance estimation block 264 uses the data obtained in the test mode to estimate the capacitance of the capacitor 216 at a particular operating time. The capacitance estimation block 264 implements a Kalman filter, which may be referred to as the diagnostic Kalman filter. The degradation estimate block 266 estimates the wear or degradation of the capacitor 216 at the particular operating time using the estimated capacitance. The degradation estimate block 266 implements a second Kalman filter, which may be referred to as the prognostic Kalman filter. The forecasting block 268 uses the output of the degradation estimate block 266 to forecast a time when the power converter 210 will reach a failure criteria 274 based on the estimate of the capacitance.

The control system 230 includes an electronic processing module 232, an electronic storage 234, an input/output (I/O) interface 236, and a sensing input 237. The electronic processing module 232 includes one or more electronic processors. The electronic processors of the processing module 232 may be any type of electronic processor and may or may not include a general purpose central processing unit (CPU), a graphics processing unit (GPU), a microcontroller, a field-programmable gate array (FPGA), Complex Programmable Logic Device (CPLD), and/or an application-specific integrated circuit (ASIC).

The electronic storage 234 may be any type of electronic memory that is capable of storing data and instructions in the form of computer programs or software, and the electronic storage 234 may include volatile and/or non-volatile components. The electronic storage 234 and the processing module 232 are coupled such that the processing module 232 is able to access or read data from and write data to the electronic storage 234. The electronic storage 234 also stores instructions for controlling the rectifier 217 and the inverter 219.

The electronic storage 234 stores instructions that, when executed, cause the electronic processing module 232 to analyze data and/or retrieve information. The electronic storage 234 includes instructions that cause the processing module 232 to analyze data 222 from the sensor 242. The electronic storage 234 also includes instructions in the form of software, subroutines, and/or functions that implement the life estimation module 260, the test mode block 262, the capacitance estimation block 264, the degradation estimate block 266, and the forecasting block 268.

The electronic storage 234 also stores parameters of the power converter 210 that are used by the life estimation module 260. For example, the electronic storage 234 may store default and/or pre-defined values of an amount of time to charge the capacitor 216, an amount of time to discharge the capacitor 216, and/or a nominal or expected life of the capacitor 216. The electronic storage 234 also stores a value that represents an original capacitance (Cap) of the capacitor 216, which is the capacitance of the capacitor 216 prior to its first use in the power converter 210. In other words, the original capacitance (Cap) is the capacitance of the capacitor 216 prior to any degradation due to use in the power converter 210.

The electronic storage 234 also stores one or more failure criteria 274 for the capacitor 216. The failure criteria 274 may be expressed as, for example, a percentage of capacitance loss, a capacitance value, or an amount of capacitance loss. The electronic storage 234 also stores a warning threshold. The warning threshold an amount of time that would provide a sufficient buffer of time for making repairs and/or replacements in the power converter 210 prior to reaching the failure criteria 274. The failure criteria 274 and the warning threshold may be entered by the manufacturer of the power converter 210 and/or set by the operator of the power converter 210.

The I/O interface 236 is any interface that allows a human operator, a separate electronic device, and/or an autonomous process to interact with the control system 230. The I/O interface 236 may include, for example, a display (such as a liquid crystal display (LCD)), a keyboard, audio input and/or output (such as speakers and/or a microphone), visual output (such as lights, light emitting diodes (LED)) that are in addition to or instead of the display, serial or parallel port, a Universal Serial Bus (USB) connection, and/or any type of network interface, such as, for example, Ethernet. The I/O interface 236 also may allow communication without physical contact through, for example, an IEEE 802.11, Bluetooth, or a near-field communication (NFC) connection. The control system 230 may be, for example, operated, configured, modified, or updated through the I/O interface 236. For example, in some implementations, an operator may trigger the test mode block 262 through the I/O interface 236.

The I/O interface 236 allows the control system 230 to communicate with components in the system 200 and with systems external to and remote from the system 200. For example, the I/O interface 236 may include a communications interface that allows communication between the control system 230 and a remote station 290. The remote station 290 is any type of station through which an operator is able to communicate with the control system 230 without making physical contact with the control system 230. For example, the remote station 290 may be a computer-based work station, a smart phone or any other type of handheld communication device, tablet, a laptop computer that connects to the control system 230 via a services protocol, or a remote control that connects to the control system 230 via a radio-frequency signal. The operator may set parameters (such as the failure criteria 274 and the warning threshold) through the I/O interface 236. The sensing input 237 includes an analog-to-digital converter (ADC) and is coupled to the estimation circuit 240. When activated, the sensing input 237 receives data from the sensor 242 and digitizes the data for use by the control system 230. In some implementations, the sensing input 237 is part of the I/O interface.

The power converter 210 also includes the estimation circuit 240. FIG. 3 is a schematic of the estimation circuit 240 connected to the power converter 210. The estimation circuit 240 is an example of an implementation of the estimation circuit 140 (FIG. 1), and the estimation circuit 240 may be used in the power converter 110. In FIG. 3, the elements with solid line outlines are part of the estimation circuit 140. The elements with dashed line outlines are not part of the estimation circuit 240.

The estimation circuit 240 includes a voltage sensor 242, a charging switch 246, a discharge control switch 245, an isolation switch 243, and a resistor 244. Each switch 243, 245, 246 may be any kind of switch. For example, each switch 243, 245, 246 may be a transistor.

The voltage sensor 242 is connected in parallel with the capacitor 216. The isolation switch 243 controls the electrical connection between the inverter 219 and the energy storage apparatus 218. When the isolation switch 243 is open, the capacitor 216 and the energy storage apparatus 218 are disconnected from the inverter 219. When the isolation switch 243 is closed, the capacitor 216 and the energy storage apparatus 218 are electrically connected to the inverter 219. The charging switch 246 controls the electrical connection between the rectifier 217 and energy storage apparatus 218.

Figure 4:
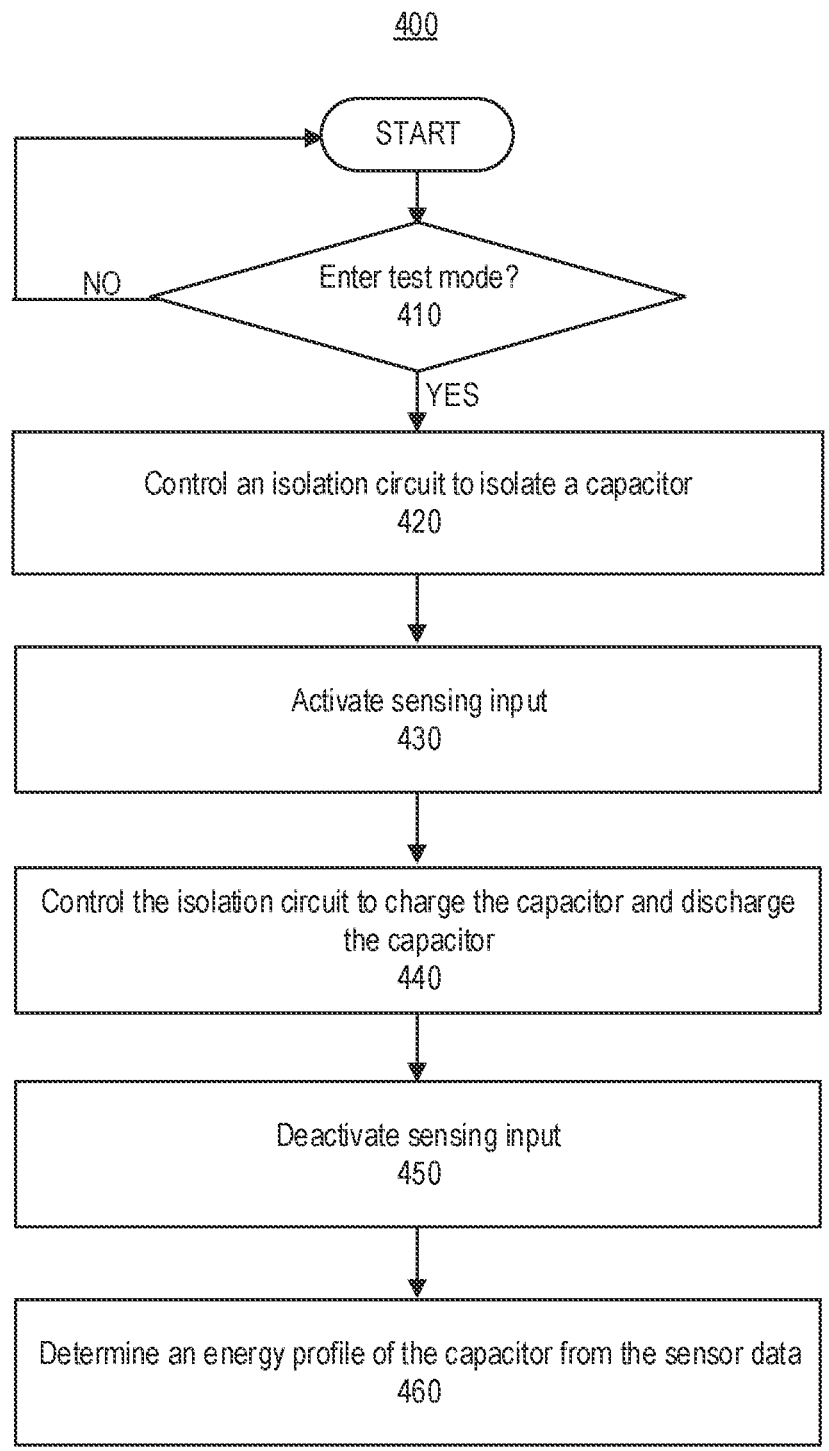
FIG. 4 is a flow chart of an example of a process to place a power converter in a test mode.

Under normal and typical operation of the power converter 210, the charging switch 246 is closed, the isolation switch 243 is closed, and the discharge control switch 245 is open. The rectifier 217 outputs the rectified current idc. The rectified current idc flows through the closed charging switch 246 and the resistor 244 into the capacitor 216. The inverter 219 modulates energy stored in the capacitor 216 into the drive signal 204, which is provided to the load 202. The power converter 210 is placed in a test mode to obtain data 222 from the estimation circuit 240. FIG. 4 is a flow chart of a process 400 to place the power converter 210 in the test mode to obtain data for estimating the remaining life of the capacitor 216. The test mode block 262 is a set or collection of machine executable instructions stored on the electronic storage 234 that, when executed by the electronic processing module 232, perform the process 400. In the example discussed with respect to FIG. 4, the switches 243, 245, and 246 are transistors.

The power converter 210 operates in its normal and typical manner unless a trigger to enter the test mode is received (410). As discussed above, when the power converter 210 operates in its normal and typical manner, the isolation switch 243 is closed, the charging switch 246 is closed, and the discharge control switch 245 is open.

The trigger may be an internal trigger that arises upon the occurrence of a predetermined condition. For example, control system 230 may be configured to enter the test mode on a scheduled basis, such as, for example every hour, week, or month; after the power converter 210 has been in operation for a predefined amount of time (for example, a predefined number of hours or weeks); or at an interval specified by the operator of the power converter 210. In another example, the internal trigger is generated when the certain performance or operational criteria related to the power converter 210 occur. For example, the internal trigger may be generated if a ripple on the rectified current idc exceeds a predefined threshold. In implementations that use an internal trigger to initiate the test mode, the parameters of the internal trigger are stored on the electronic storage 234. The internal trigger initiates the test mode automatically based on the occurrence of the predetermined condition without operator intervention.

The trigger to enter the test mode may be an external trigger. An external trigger may be initiated through the I/O interface 236 of the control system 230. For example, an operator of the power converter 210 may request a health status check of the capacitor 216 at any time by entering the request at the I/O interface 236. External triggers may be periodic or on-demand. For example, the remote device 290 may be programmed to trigger the test mode on a periodic basis by sending a request to the control system 230 through the I/O interface 236. The control system 230 may be configured to use both internal and external triggers, only internal triggers, or only external triggers.

If there is no trigger to enter the test mode, the power converter 210 continues to operate under its normal and typical operation.

If there is a trigger to enter the test mode, the process 400 advances to (420) and the life estimation module 260 initiates the test mode block 262 to begin the test mode. The test mode block 262 controls the estimation circuit 240 to isolate the capacitor 216 from the inverter 219 by causing the isolation switch 243 to open. To cause the isolation switch 243 to open, the test mode block 262 provides a voltage to a gate of the isolation switch 243 such that the isolation switch 243 changes state from ON (closed) to OFF (open). The capacitor 216 remains connected to the rectifier 217 and the current idc flows to the capacitor 216.

The sensing input 237 is activated (430), and the control system 230 receives data from the sensor 242. Data received from the sensor 242 is stored on the electronic storage 234. The test mode block 262 controls the estimation circuit 240 such that the capacitor 216 charges and discharges (440) as follows. To cause the capacitor 216 to charge, the test mode block 262 allows the capacitor 216 to charge through the closed charging switch 246 during a charging period, which is a length of time equal to a pre-determined charge time. The voltage across the capacitor 216 reaches its maximum value (Vmax) at the end of the charging period. The pre-determined charge time is a parameter of the power converter 210 and is stored on the electronic storage 234. While the capacitor 216 is charging, the voltage sensor 242 measures the voltage across the capacitor 216 and provides the data 222 (which includes a representation of the voltages measured during the charge period) to the control system 230.

After the pre-determined charge period, the test mode block 262 causes the capacitor 216 to discharge by opening the charge switch 246 and closing the discharge control switch 245. The charge that accumulated in the capacitor 216 during charging begins to discharge. The test mode block 262 allows the capacitor 216 to discharge for a discharge period. The length of the discharge period is set by a pre-determined discharge time, which is a parameter of the power converter 210 and is stored on the electronic storage 234. While the capacitor 216 is discharging, the voltage sensor 242 measures the voltage across the capacitor 216 and provides the data 222 (which includes a representation of the voltages measured during the discharge period) to the control system 230.

After the pre-determined discharge time occurs, the test mode block 262 deactivates the sensing input 237 such that the control system 230 stops receiving data from the voltage sensor 242 (450).

Figure 5:
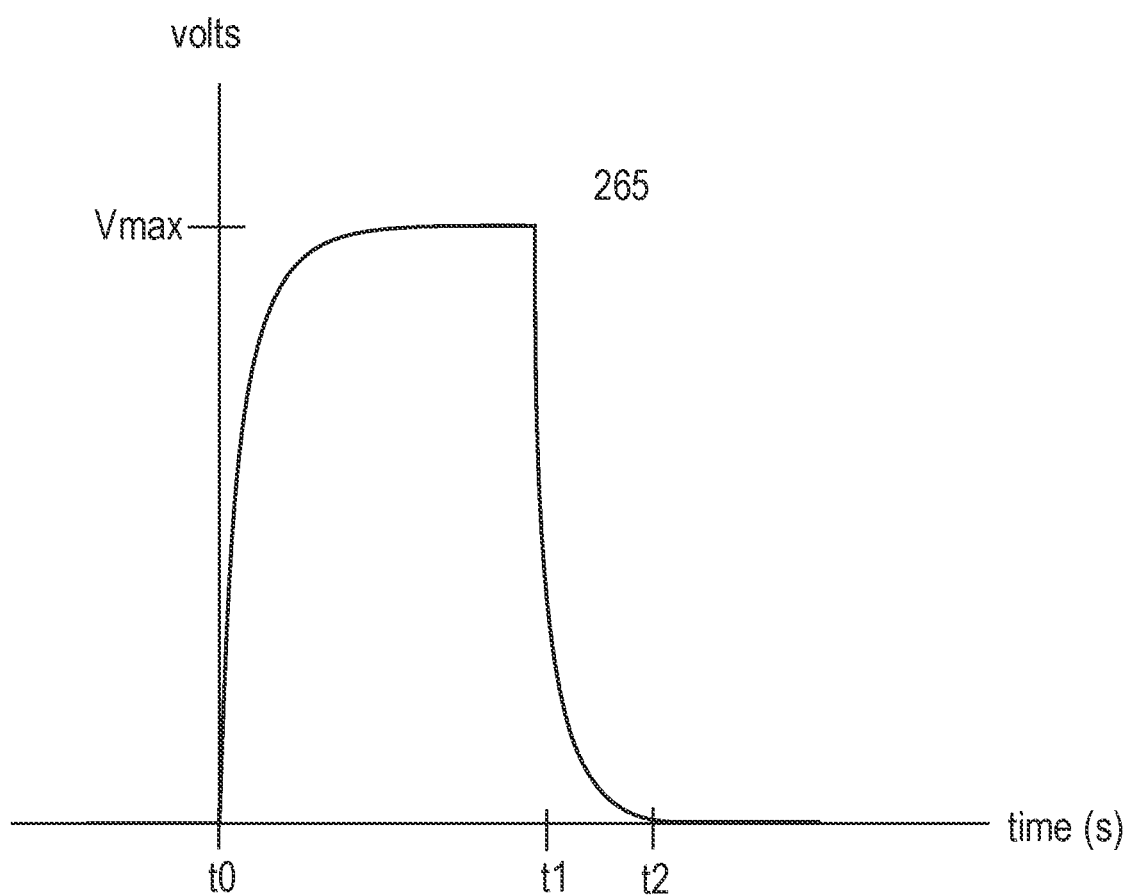
FIG. 5 is an example of an energy profile.

The test mode block 262 determines an energy profile 265 (FIG. 5) of the capacitor 216 from the sensor data 222 (460). The energy profile 265 is the voltage measured by the voltage sensor 242 during the charge period (t0 to t1 in FIG. 5) and the discharge period (t1 to t2 in FIG. 5).

Figure 6:
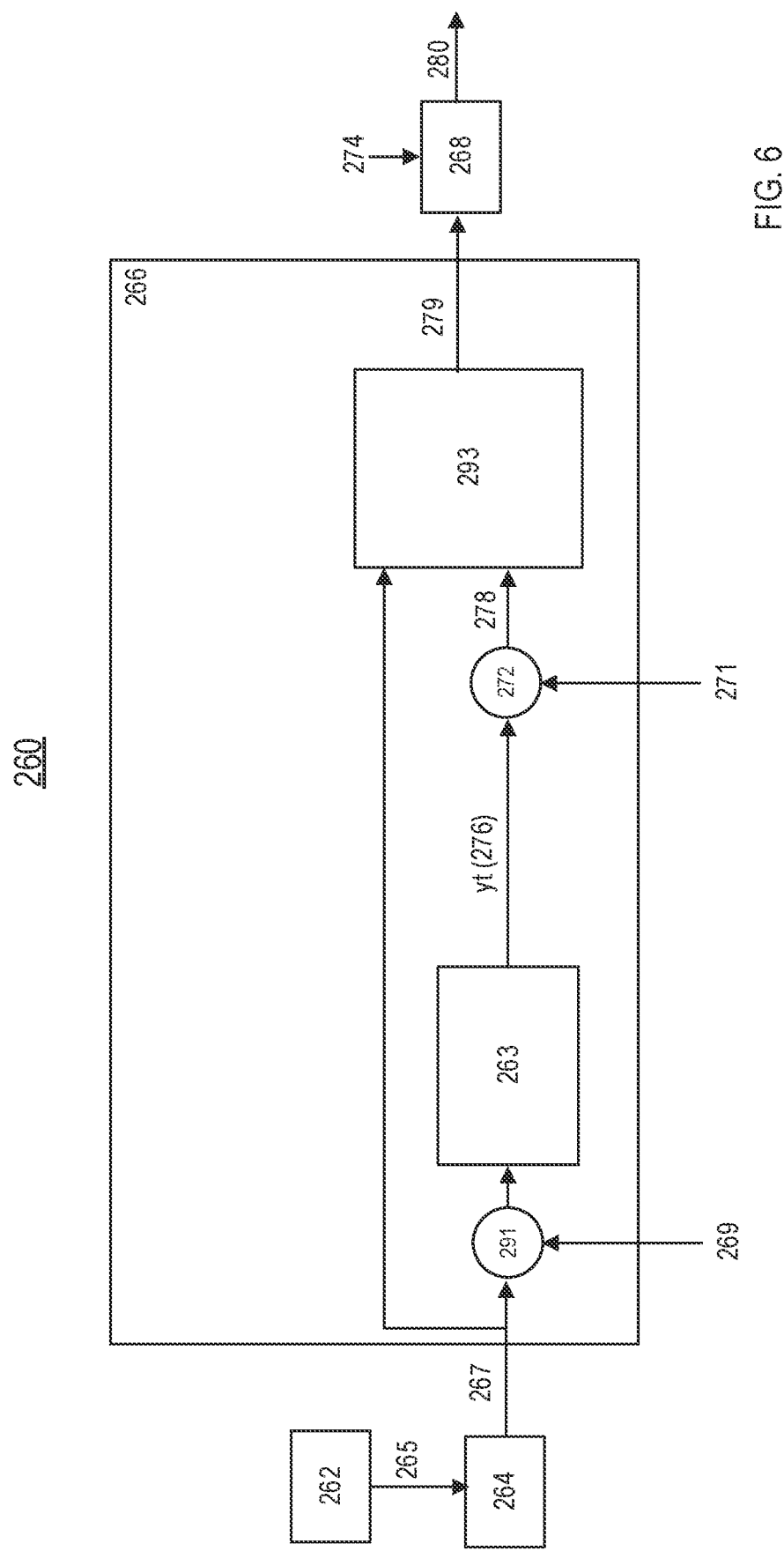
FIG. 6 is a block diagram of an example of a life estimation module.

Referring also to FIG. 6, which is a block diagram of the life estimation module 260, the capacitance estimation block 264 uses the energy profile 265 to estimate the capacitance of the capacitor 216 at a particular operation time k. The capacitance estimation block 264 uses the diagnostic Kalman filter to estimate the capacitance at the operation time k, as discussed below. The charging of the capacitor 216 during the charging period (time to t0 time t1 in FIG. 5) is expressed as:

$$e^{\frac{-t}{RC}} = 1 - \left(\frac{Vc1}{VMax}\right), \quad \text{Equation (1)}$$

where Vmax is the maximum voltage across the capacitor 216 measured during the test mode in volts, R is the value of the resistor 244 in ohms, t is a time during the charging period in seconds (the x axis in FIG. 5), Vc1 is the measured voltage across the capacitor 216 at the time t, and C is the capacitance of the capacitor 216 in Farads at the operation time k. The discharging of the capacitor 216 during the discharge period (t1 to t2 in FIG. 5) is expressed as:

$$e^{\frac{-t}{RC}} = \frac{Vc1}{VMax}. \quad \text{Equation (2)}$$

The values of Vc1 and Vmax available from the energy profile 265. The left hand side of Equation (1) or Equation (2) is the state of a Kalman filter:

$$\frac{\dot{x}}{x} = -\frac{1}{RC}, \quad \text{Equation (3)}$$

where x is $$e^{\frac{-t}{RC}}$$

and the derivative of x (which is represented as $\dot{x}$) divided by x is $-1/(RC)$. The Kalman state-space equation is:

$$\begin{bmatrix} x_t \\ \dot{x}_t \end{bmatrix} = \begin{bmatrix} 1 & \Delta t \\ 0 & 1 \end{bmatrix} \begin{bmatrix} x_{t-1} \\ \dot{x}_{t-1} \end{bmatrix}$$

Equation (4), where Δt is the time between two voltage samples on the energy profile 265. If the charging portion of the energy profile 265 is used, the two voltage samples are between the time t0 and the time t1. If the discharge portion of the energy profile 265 is used, the two voltage samples are between the time t1 and the time t2. The value of the capacitance (C) of the capacitor 216 at the operation time k is estimated from Equation (4) and is output as a capacitance estimate 267 by the capacitance estimation block 264. The capacitance estimate 267 is provided to an adder 291 that adds an estimate of the process noise 269 to the capacitance estimates 267. The output of the adder 291 is provided to a plant block 263 that models the degradation of the capacitor 216 over time as:

$$yt = \left(\frac{\Delta C}{\text{Cap}}\right)_t = e^{At}, \quad \text{Equation (5)}$$

where Cap is the original capacitance of the capacitor 216 at its initial use, ΔC is the estimated decrease in the capacitance of the capacitor 216 at the operation time k as determined by subtracting the capacitance estimate 267 from Cap; and A is the model parameter for the plant block 263. The plant block 263 outputs the degradation state yt (276) to an adder 272 that adds measurement sensor noise 271 to the degradation state yt (276) to produce an output 278.

The output 278 and the capacitance estimate 267 are provided to a filter block 293 that implements the prognostics Kalman filter as follows. The expression in Equation (5) may be expanded using the Taylor series expansion into a polynomial function and expressed in matrix form as:

$$\begin{bmatrix} x_k \\ \dot{x}_k \\ \ddot{x}_k \end{bmatrix} = \begin{bmatrix} 1 & \Delta t & \frac{\Delta t^2}{2} \\ 0 & 1 & \Delta t \\ 0 & 0 & 1 \end{bmatrix} \begin{bmatrix} x_{k-1} \\ \dot{x}_{k-1} \\ \ddot{x}_{k-1} \end{bmatrix}, \quad \text{Equation (6)}$$

where Δt is the time step between k and k−1 (which is the time associated with the prior estimate of x). The filter block 293 implements Equation 6 (a Kalman filter) to calculate a state estimate for $x_{k|k-1}$, which is the predicted degradation state of the capacitor 216 at the operation time k, and an estimate for the parameter A. The value of A is initialized to zero (0) the first time the life estimation module 260 is performed.

The filter block 293 also corrects the state estimate $x_{k|k-1}$ to a corrected state estimate $x_{k|k}$ by first computing an error term e according to Equation (7):

$$e_k = u_k - x_{k|k-1}. \quad \text{Equation (7)}$$

In Equation (7), uk is the observed degradation of the capacitor 216 at the operating time k and is input into the filter block 293 as the capacitance estimate 267. Next, the corrected state estimate $x_{k|k}$ is calculated according to Equation (8):

$$x_{k|k} = x_{k|k-1} + K_k(e_k), \quad \text{Equation (8)}$$

where K is the Kalman gain value that reduces the error term e. The error term e as shown in equation 7 is the difference between what was measured and predicted using the Equation (5) and the estimated value A. The value of K may be biased toward the measurement or toward the estimated parameter A. If there is an increasing trend in the degradation of the capacitance, K is tuned to be biased towards the measurement.

The corrected state estimate $x_{k|k}$ (labeled as output 279 in FIG. 6) is provided to the forecasting block 268. The forecasting block 268 uses value of the parameter A that was estimated from Equation (6) with Equation (5) to forecast the time when the capacitor 216 will reach a failure criteria 274 that is specified in terms of the capacitance loss (ΔC-Cap) relative to the original capacitor value (Cap).

The forecasting block 268 produces an output 280 that indicates the remaining life of the capacitor 216. In implementations in which the failure criteria 274 is a specified drop in capacitance of the capacitor 216 relative to the original capacitance (Cap) expressed as ΔC/Cap, the output 280 may be a numerical value that represents the amount of time until the capacitor 216 will reach the specified drop in capacitance. For example, the failure criteria 274 may be a 10% drop relative to the original capacitance (Cap). In these implementations, the forecasting block 268 uses Equation (5) with the value of the quantity (ΔC/Cap) set to 0.1 and the value of A from Equation (6) to predict a time t when the capacitor 216 is expected to have lost 10% of the original capacitance (Cap). In this example, the time t is included in the output 280. The output 280 also may include the value of (ΔC/Cap) and/or the value of the estimated current capacitance of the capacitor 216. The output 280 may include additional information. For example, the output 280 may include a value that represents an estimate of A. In another example, the output 280 may include an amount of time between the operating time k and the estimated time at which the failure criteria will be reached.

Figure 7:
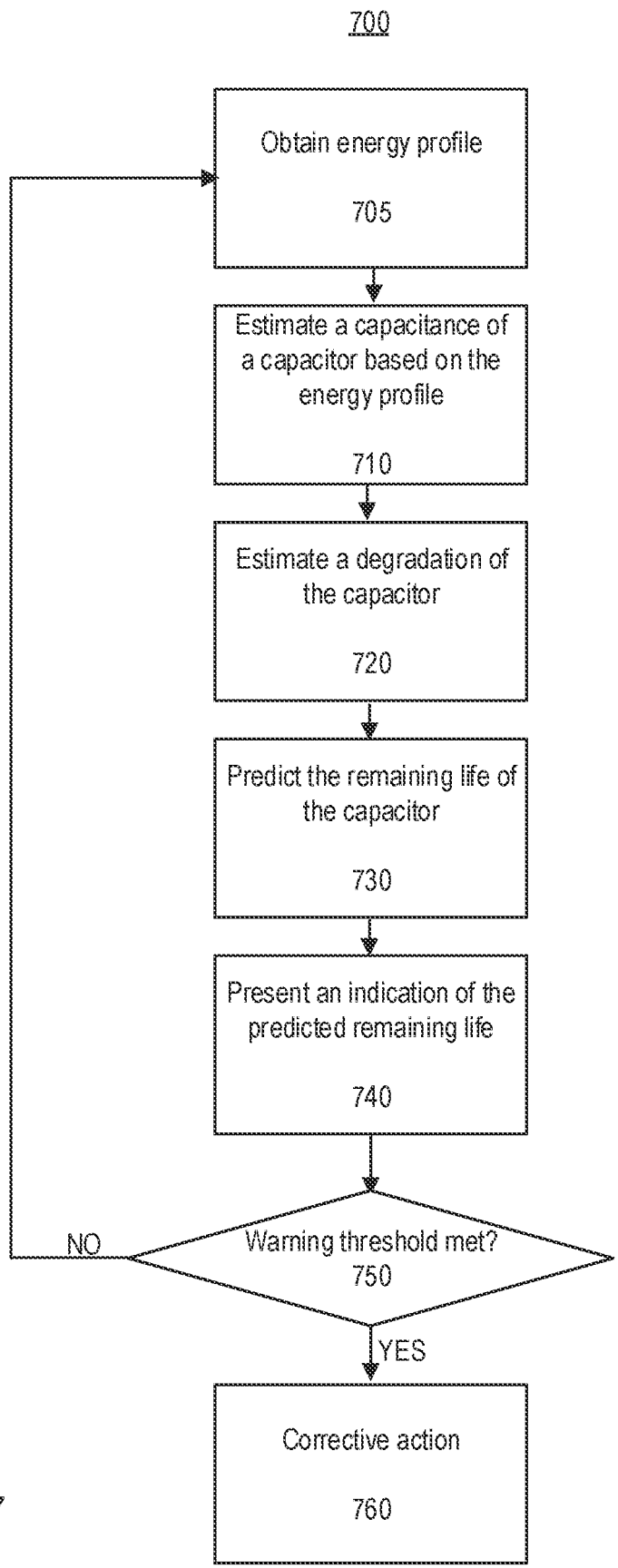
FIG. 7 is a flow chart of an example of a process for predicting the remaining life of a capacitor.

FIG. 7 is a flow chart of a process 700 for predicting the remaining life of a capacitor. The process 700 is implemented by the life estimation module 260 and is discussed with respect to the control system 230 and the capacitor 216. However, the process 700 may be used to estimate the remaining life in a capacitor in any power converter.

The process 700 begins at (720) by obtaining the energy profile 265 at an operating time k. The energy profile 265 is determined from the process 400 (FIG. 4). The energy profile 265 is provided to the capacitance estimation block 264, which estimates the capacitance of the capacitor 216 at an operating time k (710). The estimated capacitance is provided to the degradation estimation block 266, which estimates a degradation state estimate 279, as discussed with respect to FIG. 6 (720).

The forecasting block 268 predicts the remaining life of the capacitor 216 (730). The remaining life of the capacitor 216 is a value that represents the time at which the capacitance of the capacitor 216 is predicted to decrease to the failure criteria 274. The remaining life may be expressed as a time in the future or as a temporal duration that represents the time between the current time and the predicted time of reaching the failure criteria. As discussed above, the failure criteria 274 may be expressed as a decrease in the capacitance of the capacitor 216 relative to the original capacitance (Cap) or (ΔC/Cap), where ΔC is the estimated decrease in the capacitance of the capacitor 216 relative to the original capacitance (Cap). Moreover, the remaining life may be presented graphically. For example, a plot of the expected degradation as a function of operating time may be presented based on Equation (5) and the estimated value of A.

The predicted remaining life of the capacitor 216 may be output through the I/O interface 236 and presented to the operator (740). For example, the predicted remaining life may be presented visually on a screen at the power converter 210 or provided to the remote station 290. In implementations in which the predicted remaining life is provided to the remote station 290, the predicted remaining life may be displayed at a workstation or computer, texted to a phone, and/or sent as an email to the operator.

The predicted remaining life of the capacitor 216 is compared to a warning threshold (750). The warning threshold is an amount of time that provides sufficient time for a repair or replacement of the capacitor 216 or the power converter 210 prior to the capacitor 216 reaching the failure criteria. For example, the failure criteria 274 may be a decrease in capacitance (ΔC/Cap) of 10% and the warning threshold may be two months. If the amount of time between the current time and the time corresponding to the time when the capacitor 216 is estimated to be degraded to the failure criteria 274 is greater than the warning threshold, the process 700 returns to (705) and obtains the energy profile 265 for another operating time k. The energy profile 265 may be determined on a regular basis or on-demand based on operator's request.

If the predicted remaining life of the capacitor 216 is less than the warning threshold, corrective action is taken (760). Continuing the above example in which the warning threshold is two months, if the remaining life predicted at (730) is a time that is six weeks in the future, the remaining life of the capacitor 216 is deemed to be less than the warning threshold, and corrective action is taken.

The corrective action may include placing the power converter 210 in a low-stress operating mode in which the switching frequency of the switches SW1 to SW2 and/or the switches 215-1 to 215-6 is decreased. The control system 230 may automatically place the power converter 210 in the low-stress operating mode after the predicted remaining life is below the warning threshold, or an option to enter the low-stress mode may be presented to the operator though the I/O interface 236. The corrective action also may include presenting an alarm at the power converter 210 and/or at the remote station 290.

These and other implementations are within the scope of the claims. For example, although the control systems 130 and 230 estimates the remaining life of the respective capacitors 116 and 216 based on a direct estimate of the capacitance and do not rely on secondary effects such as, for example, measurements of ripple current and/or sound, the control system 130 and/or the control system 230 may be implemented in a system that also uses secondary effects.

What is claimed is:

1. A drive system comprising:
    a first electrical network configured to convert time-varying power to direct current (DC) power;
    a second electrical network configured to convert DC power to time-varying power;
    an energy storage apparatus electrically connected to the first electrical network and the second electrical network;
    an estimation circuit comprising:
        an isolation switch configured to isolate the energy storage apparatus from the second electrical network;
        a discharge control switch; and
        an electrical sensor configured to measure data related to the energy storage apparatus; and
    a control system configured to estimate a remaining life of the energy storage apparatus based on data measured by the electrical sensor while the energy storage apparatus is isolated.

2. The drive system of claim 1, wherein the electrical sensor is in parallel with the energy storage apparatus.

3. The drive system of claim 2, wherein the electrical sensor comprises a voltage sensor.

4. The drive system of claim 3, wherein the data measured by the electrical sensor comprises a voltage profile that represents a voltage of the energy storage apparatus at a plurality of times, and the control system estimates the remaining life of the energy storage apparatus based on the voltage profile.

5. The drive system of claim 4, wherein the control system is further configured to:
    control the isolation switch to isolate the energy storage apparatus;
    control a charging switch to electrically connect the first electrical network and the energy storage apparatus;
    open the discharge control switch to charge the energy storage apparatus for a first time period;
    control the charging switch to disconnect the first electrical network from the energy storage apparatus; and
    close the discharge control switch to discharge the energy storage apparatus for a second time period.

6. The drive system of claim 5, wherein the voltage profile comprises voltages measured by the voltage sensor during the first time period and voltages measured by the voltage sensor during the second time period.

7. An apparatus for a drive system, the apparatus comprising:
    a control system configured to:
        control an isolation switch in an estimation circuit to isolate an energy storage apparatus of the drive system from an electrical network of the drive system during a first time period and a second time period this is after the first time period, the electrical network configured to convert DC power to time-varying electrical power;
        control a charging switch and a discharge switch to charge the energy storage apparatus for the first time period;
        control the charging switch and the discharge switch to discharge the energy storage apparatus during the second time period;
        determine an energy profile of the energy storage apparatus based on measurements taken during the first time period and the second time period; and
        estimate a remaining life of the energy storage apparatus based on the energy profile.

8. The apparatus of claim 7, wherein the energy profile comprises a measured voltage across the energy storage apparatus during the first time period and the second time period.

9. The apparatus of claim 7, wherein the control system is further configured to receive a trigger, and the control system is configured to control the isolation switch, control the charging switch and the discharge switch, determine the energy profile, and estimate the remaining life only in response to receiving the trigger.

10. The apparatus of claim 9, wherein the control system comprises an input/output (I/O) interface.

11. The apparatus of claim 10, wherein the trigger comprises an input provided through the (I/O) interface.

12. The apparatus of claim 9, wherein the trigger comprises an internal trigger.

13. The apparatus of claim 12, wherein the internal trigger is generated on a pre-determined schedule such that the remaining life of the energy storage apparatus.

14. The apparatus of claim 9, wherein the control system is configured to provide an indication of the estimate of the remaining life through an I/O interface.

15. The apparatus of claim 14, wherein the control system is configured to provide an alarm when the estimate of the remaining life is less than a pre-determined amount of time.

16. The apparatus of claim 7, wherein the control system is configured to estimate a capacitance of the energy storage apparatus based on the energy profile, and to estimate the remaining life based on the estimated capacitance.

17. The apparatus of claim 16, wherein the control system is configured to estimate the capacitance using a diagnostic Kalman filter, and to estimate the remaining life using a prognosis Kalman filter.

18. The apparatus of claim 7, further comprising the estimation circuit.

19. The apparatus of claim 7, wherein the control system is further configured to provide a recommendation for operating the drive system in a low stress mode if the remaining life is less than a threshold value.

20. A method comprising:
isolating an energy storage apparatus of a drive system from an inverter of the drive system during a first time period and a second time period;
monitoring the energy storage apparatus with a sensor while charging the energy storage apparatus during the first time period and discharging the energy storage apparatus during the second time period;
determining an energy profile of the energy storage apparatus based on data from the sensor, the data from the sensor comprising measurements of one or more electrical properties related to the energy storage apparatus made by the sensor during the first time period and the second time period; and
estimating a remaining life of the energy storage apparatus based on the energy profile.

21. The method of claim 20, further comprising: estimating a capacitance of the energy storage apparatus based on the energy profile, and wherein the remaining life is estimated based on the estimated capacitance.

22. The method of claim 21, wherein the capacitance is estimated using a diagnostic Kalman filter, and the remaining life is estimated using a prognosis Kalman filter.

* * * * *